US012735608B2

(12) United States Patent
Defoer

(10) Patent No.: US 12,735,608 B2
(45) Date of Patent: Sep. 15, 2026

(54) HIGH FREQUENCY WELDABLE POLYOLEFIN COMPOSITION

(71) Applicant: Borealis AG, Vienna (AT)

(72) Inventor: Johan Defoer, Mechelen (BE)

(73) Assignee: BOREALIS GMBH, Vienna (AT)

( * ) Notice: Subject to any disclaimer, the term of this patent is extended or adjusted under 35 U.S.C. 154(b) by 118 days.

(21) Appl. No.: 18/708,420

(22) PCT Filed: Nov. 24, 2022

(86) PCT No.: PCT/EP2022/083080
§ 371 (c)(1),
(2) Date: May 8, 2024

(87) PCT Pub. No.: WO2023/099323
PCT Pub. Date: Jun. 8, 2023

(65) Prior Publication Data

US 2025/0011626 A1 Jan. 9, 2025

(30) Foreign Application Priority Data

Dec. 3, 2021 (EP) .................................... 21212373

(51) Int. Cl.

| | |
|---|---|
| ***B29C 65/00*** | (2006.01) |
| ***C09J 5/00*** | (2006.01) |
| ***C09J 7/38*** | (2018.01) |
| *B29C 65/08* | (2006.01) |
| *B29K 23/00* | (2006.01) |
| *B29K 105/00* | (2006.01) |

(52) U.S. Cl.
CPC ............... *C09J 7/381* (2018.01); *B29C 66/71* (2013.01); *C09J 5/00* (2013.01); *B29C 65/08* (2013.01); *B29K 2023/08* (2013.01); *B29K 2105/0094* (2013.01); *B29K 2995/0063* (2013.01); *C09J 2301/414* (2020.08)

(58) Field of Classification Search
CPC .......... B29C 65/14; B29C 66/71; C09J 7/381; C09J 5/00
USPC ...................................................... 156/272.2
See application file for complete search history.

(56) References Cited

U.S. PATENT DOCUMENTS

| | | | |
|---|---|---|---|
| 6,558,809 B1 | | 5/2003 | Kelch et al. |
| 11,192,349 B2 | * | 12/2021 | Oderkerk .......... B32B 17/10678 |
| 2020/0095483 A1 | | 3/2020 | Fagrell et al. |

FOREIGN PATENT DOCUMENTS

| | | |
|---|---|---|
| EP | 4095195 A1 | 5/2021 |
| WO | 2020069951 A1 | 4/2020 |

OTHER PUBLICATIONS

International Search Report of Application No. PCT/EP2022/083080 Dated Mar. 7, 2023.

* cited by examiner

*Primary Examiner* — James D Sells
(74) *Attorney, Agent, or Firm* — Lippes Mathias LLP

(57) ABSTRACT

A cross-linkable polyethylene composition for high frequency welding comprising a copolymer (A) of ethylene, and an -olefin comonomer (A1) with 3 to 12 carbon atoms having a density of from 850 to 970 kg/m$^3$, a terpolymer (B) of ethylene, a polar comonomer (B1) and a cross-linkable comonomer (B2).

16 Claims, No Drawings

HIGH FREQUENCY WELDABLE POLYOLEFIN COMPOSITION

CROSS REFERENCE TO RELATED APPLICATIONS

This is a 371 of PCT Application No. PCT/EP2022/083080 filed Nov. 24, 2022, which claims the benefit of European Application No. 21212373.1, filed Dec. 3, 2021, the contents of which are incorporated herein in their entirety.

The invention relates to the field of welding of polyolefin-based articles. More particularly, it relates to a polyolefin composition weldable by dielectric heating, wherein articles made from said composition exhibit good printability, sealabilty and show good strengths of the seals.

BACKGROUND

High Frequency (HF) welding, also known as Dielectric Sealing or Radio Frequency (RF) Heat Sealing is a well-established technology that is known since the 1940's. HF welding is fast and relatively easy to perform, produces a limited degradation of the polymer even when welding thick layers, does not create fumes, requires a moderate amount of energy and can produce water-, air-, and bacteria-proof welds.

High Frequency welding provides a method of contactless, direct, volumetric heating of dielectric materials, which are defined as materials that are capable of absorbing electromagnetic energy and which are also very poor electrical conductors. This is achieved by the application of an alternating electric field generated at the given frequency range to the dielectric material. The dielectric loss factor, also known as the dielectric loss index, is a measure of the energy loss in a material and is indicative of how well that material can be heated in the high frequency, alternating electric field. If a material has a relatively high dielectric loss index, it may be well-suited for subjection to dielectric heating. In such a case dielectric heating offers a clean and controllable process that eliminates problems associated with the application of direct heat to a variety of materials. Thus, the process has been found to be economically attractive for use in certain commercial and industrial manufacturing processes. Dielectric heating is typically carried out using radio frequency (RF) waves (3 kHz to 300 GHz), which include microwaves (300 MHz to 300 GHz). Together these wave ranges are referred to as high frequency (HF) waves.

In high frequency (HF) welding or sealing, at least one surface of a sheet or film of a suitable material as described above is welded or sealed, either to another surface of the same sheet or face of another sheet or film, in order to fabricate a sealed article. The resulting weld can be as strong as the original materials. The process involves subjecting the parts to be joined to a high frequency electromagnetic field, which is normally applied between two metal bars. These bars also act as pressure applicators during heating and cooling. The dynamic electric field causes the molecules in polar thermoplastics to oscillate.

Depending on their geometry and dipole moment, these molecules may translate some of this oscillatory motion into thermal energy and cause heating of the material.

The most prominent polymer usable in HF welding is polyvinyl chloride. However, chlorinated compounds may cause environmental or toxicological challenges that manufacturers would like to avoid.

Hence, it has been a constant topic of research to find means to make a normally non-lossy material such as polyolefins suitable for HF welding. One approach was to incorporate some proportion of a second, RF responsive material therein.

WO 2002/088229 discloses dielectric heating thermoplastic compositions including incorporating a molecular sieve with at least one interpolymer described as comprising (i) polymer units derived from at least one aliphatic olefin monomer having from 2 to 20 carbon atoms; and (ii) polymer units derived from (a) at least one vinyl or vinylidene aromatic monomer, or (b) from at least one sterically hindered aliphatic or cycloaliphatic vinyl or vinylidene monomer, or (c) from a combination of at least one vinyl or vinylidene aromatic monomer and at least one sterically hindered aliphatic or cycloaliphatic vinyl or vinylidene monomer, and optionally, (d) polymer units derived from at least one ethyleneically unsaturated polymerizable monomer other than that derived from (a), (b) or (c). An example thereof would be an ethylene-styrene interpolymer.

JP-A-10-219048 describes HF weldable polypropylene compositions consisting of fine metal oxide particles, ion-substituted zeolite, and polypropylene. The ion-substituted zeolite, in which a portion or all of the exchangeable ions are replaced with ammonium ions and silver ions, is used as a nucleating agent and chlorine scavenger.

EP 193 902 proposes to use zinc oxide, bentonite clay, or crystalline and amorphous alkali or alkaline earth metal aluminosilicates as HF sensitizers for high molecular weight, high density polyethylene or ultrahigh molecular weight polyethylene. It is taught therein that the radio frequency sensitizers have to be essentially dried prior to use.

However, all of these attempts have the drawback of inclusion of materials into the composition, which are not otherwise needed for the property profile of the composition itself. Therefore, attempts were made to include the dipole characteristic directly into the polymer.

EP 0 149 782 discloses compositions comprising silane-grafted polyolefins and a crystalline zeolite. The compositions are shapeable into articles, which can be cross-linked after shaping by exposure to humidity and/or microwaves.

KR 2005 0017153 (A) provides a polyethylene based resin composition using ethylene-vinyl acetate copolymer and ethylene-glycidyl methacrylate copolymer, in particular (A) 30-70 parts by weight of high-density polyethylene resin having 0.935-0.965 g/cm$^3$ of density and 0.05-5 g/10 min of melting index; (B) 30-40 parts by weight of ethylene-vinyl acetate copolymer having amount of vinyl acetate in 30-40 parts by weight and 3-10 g/10 min of melting index; and (C) 10-20 parts by weight of ethylene-glycidyl methacrylate copolymer having the amount of glycidyl methacrylate in 30-40 parts by weight. Further attempts were made to provide HF weldable compositions based on polyolefins in combination with vinyl acetates, cf. UK 2 177 974. WO 94/12569 discloses the usage of blends of propylene-ethylene copolymers and an ethylene-alkyl acrylate copolymer for HF welding. Further attempts are based on carbon monoxide base monomers (WO 00/69629) and polyamides (U.S. Pat. No. 3,336,173). Apart from the general problem of not having the possibility to process pure polyolefinic material, ethylene vinyl acetates as used in the prior art are known to have inferior mechanical properties afforded by some applications involving HF welding.

Other attempts were made, in which films were produced having different layers, wherein at least one layer has dielectric properties suitable for HF welding and the other layer is a polyolefin receiving the heat from the other layer during HF welding, i.e. in a sandwich structure, cf. JP 2003 320583 (A) and JP S 59184611 (A). However, those applications do not allow for a pure polyolefin article to be welded by HF welding.

Object of the Present Invention

Therefore, in view of the problems cited above, there is still a need for polymer compositions suitable for HF welding, which avoid chlorinated material such as PVC, allow for direct processing (i.e. without the help of other materials such as molecular sieves or helper layers in the film), exhibiting good seal strength and printability. In particular, there is a need for such polymer compositions which can be formed into HF weldable structures, including, for example, a film a sheet, a foam, a profile, fibers, a molding, or a fabricated article.

SUMMARY OF THE INVENTION

It has now surprisingly been found that the above-mentioned object can be achieved by a cross-linkable polyethylene composition for high frequency welding comprising

- a copolymer (A) of ethylene and an -olefin comonomer (A1) with 3 to 12 carbon atoms having a density of from 850 to 970 kg/m$^3$, and
- a terpolymer (B) of ethylene, a polar comonomer (B1) and a cross-linkable comonomer (B2).

It has been further found that above-mentioned object is solved by an article suitable for high frequency welding comprising said cross-linkable polyethylene composition.

It has been further found that above-mentioned object is solved by the use of said cross-linkable polyethylene composition for high frequency welding.

DETAILED DESCRIPTION OF THE INVENTION

The present invention relates to a cross-linkable polyethylene composition for high frequency welding comprising

- a copolymer (A) of ethylene and an -olefin comonomer (A1) with 3 to 12 carbon atoms having a density of from 850 to 970 kg/m$^3$, and
- a terpolymer (B) of ethylene, a polar comonomer (B1) and a cross-linkable comonomer (B2).

The cross-linkable polyethylene composition has preferably a sealing time of lower than 7 s, preferably lower than 6 s, and most preferably lower than 5 s.

The cross-linkable polyethylene composition has preferably a seal strength of at least 1.0 N/mm$^2$, preferably at least 1.5 N/mm$^2$, more preferably at least 3 N/mm$^2$, and most preferably at least 4.5 N/mm$^2$.

Thereby, the composition is preferably prepared by compounding the two polymers (A) and (B) in an extruder. In the following said two polymers are described in more detail.

Preferably, the total amount of polymers (A) and (B) in the composition is higher or equal than 90 wt.-% with respect to the total weight of the composition, more preferably higher or equal than 95 wt.-% and most preferably higher or equal than 98 wt.-%.

Also preferably, the weight ratio of polymer (A) to polymer (B) in the composition is preferably in the range from 75:25 to 25:75, more preferably from 50:30 to 30:60 and most preferably from 55:45 to 45:55.

The term 'high frequency welding' as used herein denotes a method of contactless, direct, volumetric heating of polymers by the application of an alternating electric field generated at the given frequency range to the polymer. The method usually utilizes frequencies in the range of 3 kHz to 300 MHZ, preferably 10 kHz to 200 MHZ, more preferably 20 to 200 MHz, more preferably 25 to 72 MHz, and most preferably of 27 Mhz.

Ethylene Copolymer (A)

The crosslinkable polyolefin composition of the present invention comprises a copolymer (A) of ethylene and a $C_3$ to $C_{12}$ alpha-olefin co-monomer.

The copolymer (A) may encompass high density, medium density, low density and even very low density ethylene copolymers. It may preferably have a density in the range of from 850 to 970 kg/m$^3$, more preferably from 860 to 930 kg/m$^3$, even more preferably from 860 kg/m$^3$ to 915 kg/m$^3$, and most preferably 880 to 910° kg/m$^3$, measured according to ISO 1183-1:2004.

The copolymer (A) may preferably have a $MFR_{2.16}$ of from 0.1 to 50 g/10 min, more preferably from 0.5 to 25 g/10 min, even more preferably from 0.7 to 15 g/10 min, and most preferably from 1.0 to 10 g/10 min, measured according to ISO 1133.

The copolymer (A) is preferably a copolymer of ethylene with a $C_3$ to $C_{12}$ alpha-olefin co-monomer, more preferably with a $C_3$ to $C_{10}$ alpha-olefin co-monomer, such as propylene, 1-butene, 1-hexene, 1-octene and 1-decene, even more preferably with a $C_4$ to $C_{10}$ alpha-olefin co-monomer and still even more preferably with a $C_7$ to $C_9$ alpha-olefin co-monomer. Most preferably, copolymer (A) is a copolymer of ethylene and 1-octene. The copolymer of ethylene and 1-octene may preferably have a density in the range of 850 to 930 kg/m$^3$, more preferably in the range of 855 to 920 kg/m$^3$, even more preferably in the range of from 870 to 910 kg/m$^3$, measured according to ISO 1183-1:2004.

The ethylene copolymer (A) preferably has a DSC peak melt point measured according to ISO 11357 of from 65 to 85° C., more preferably of from 70 to 80° C.

More preferably, copolymer (A) is a bipolymer of ethylene and the $C_3$ to $C_{12}$ alpha-olefin co-monomer, most preferably copolymer (A) is a bipolymer of ethylene and 1-octene.

Preferably, ethylene-1-butene or ethylene-1-octene copolymers (plastomers) can be used. Any copolymer of ethylene and 1-butene or 1-octene having the above defined properties may be used. Preferred materials are commercially available, i.a. from *Borealis* under the tradename Queo, from DOW Chemical Corp (USA) under the tradename Engage or Affinity, or from Mitsui Chemicals under the tradename Tafmer.

Alternatively, these plastomers can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the person skilled in the art. Preferably, metallocene type catalysts are used.

Preferably, these plastomers are prepared by a one stage or two stage solution polymerization process, especially by high temperature solution polymerization process at temperatures higher than 100° C.

Such process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably, the solution polymerization process is a high temperature solution polymerization process, using a polymerization temperature of higher than 100° C. More preferably, the polymerization temperature is at least 110° C., even more preferably at least 150° C. The polymerization temperature can be up to 250° C.

The pressure in such a solution polymerization process is preferably in a range of 10 to 100 bar, more preferably 15 to 100 bar and even more preferably 20 to 100 bar. The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably, unsubstituted $C_{6-10}$-hydrocarbon solvents are used.

A known solution technology suitable for the process according to the invention is the Borceed™ technology.

Ethylene Terpolymer (B)

The ethylene terpolymer (B) contains polar comonomer units (B1) and cross-linkable comonomer units (B2).

The ethylene terpolymer (B) may either comprise, or consist of, one or more cross-linkable ethylene copolymer(s) comprising both comonomer units (B1) and (B2), or may comprise, or consist of, a mixture of different polymers which comprises ethylene copolymers with either comonomer units (B1) or comonomer units (B2) or both comonomer units (B1) and (B2). However, regardless which polymers are used, the ethylene terpolymer (B) must contain ethylene copolymers so that both (B1) and (B2) comonomer units are present in composition (B).

Preferably, the ethylene terpolymer (B) comprises, or consists of, one or more cross-linkable ethylene copolymer (s) comprising both comonomer units (B1) and (B2), still more preferably ethylene terpolymer (B) comprises, or consists of, one cross-linkable ethylene copolymer comprising both comonomer units (B1) and (B2), and most preferably ethylene terpolymer (B) consists of one cross-linkable ethylene copolymer comprising both comonomer units (B1) and (B2).

It is preferred that in the preferred embodiment where ethylene terpolymer (B) comprises one or more, preferably one, ethylene copolymer(s) comprising both comonomer units (B1) and (B2) that the one or more, preferably one, ethylene copolymer(s) comprising both comonomer units (B1) and (B2) is present in an amount of at least 10 wt.-%, more preferably of at least 15 wt.-% of the total amount of ethylene terpolymer (B).

Ethylene copolymers having both comonomer units (B1) and (B2) are preferably obtained by copolymerization of ethylene, polar comonomer units (B1) and comonomer units with hydrolysable groups (B2). The copolymerization of the ethylene, polar comonomer units (B1) and comonomer units with hydrolysable groups (B2) may be carried out under any suitable conditions resulting in copolymerization of the monomers.

Ethylene terpolymers with both (B1) and (B2) comonomer units can be produced by radical initiated high pressure polymerization. Generally, the copolymerization of the aforementioned monomers is carried out at a temperature of about 100-300° C. and at a pressure of about 100-300 MPa in the presence of a radical initiator in a polymerization reactor. Usually, the polymerization is carried out continuously, preferably in a tubular reactor, or in an autoclave reactor.

Ethylene copolymers with both (B1) and (B2) comonomer units may also be produced by grafting, e.g. by the methods described in U.S. Pat. Nos. 3,646,155 and 4,117,195. However, it is preferred that ethylene copolymers with both (B1) and (B2) comonomer units are prepared by copolymerization as described herein, and not by grafting. In other words, ethylene copolymers with both (B1) and (B2) comonomer units are preferably non-grafted ethylene copolymers with both (B1) and (B2) comonomer units.

Ethylene copolymers with both (B1) and (B2) comonomer units can be a pre-produced or in-reactor produced. Pre-produced means commercially available ethylene copolymers. Preferably, the pre-produced ethylene copolymer is a blend of two or more ethylene copolymers differing from each other, more preferably is a blend of two ethylene copolymers differing from each other.

However, ethylene copolymers with both (B1) and (B2) comonomer units are preferably in-reactor produced. Preferably, the reactor is a tubular reactor.

Preferably, the polar comonomer (B1) is present in the ethylene terpolymer (B) in an amount of 10 to 35 wt.-%, more preferably in an amount of 15 to 34 wt.-%, still more preferably in an amount of 17 to 33 wt.-%, still more preferably in an amount of 20 to 32 wt.-%, and most preferably in an amount of 25 to 30 wt.-%.

Preferably, the polar comonomer (B1) is selected from $(C_1$-$C_6)$-alkyl acrylate and $(C_1$-$C_6)$-alkyl $(C_1$-$C_6)$-alkylacrylate. More preferably, the polar comonomer (B1) is selected from methyl acrylate, ethyl acrylate and/or butyl acrylate. Among these, methyl acrylate (MA) is most preferred.

Preferably, the ethylene terpolymer (B) has a $MFR_2$ (2.16 kg/190° C.) measured according to ISO 1133 in the range from 0.1 to 50 g/10 min, preferably in the range from 25 to 35 g/10 min.

The crosslinking of ethylene copolymers with polar comonomer units and cross-linkable comonomer units is well known in the art and can be carried out by so-called moisture curing, see for example WO 00/68314. A silanol condensation catalyst is used as a catalyst.

The advantage of an in-reactor produced ethylene copolymer with both (B1) and (B2) comonomer units is that it can be directly used in the subsequent steps of the process of the invention.

Preferably, the cross-linkable comonomer (B2) is present in the ethylene copolymer composition (B) in an amount of 0.1 to 6 wt.-%, more preferably in an amount of 0.2 to 5.5 wt.-%, still more preferably in an amount of 0.3 to 5 wt.-%, and most preferably in an amount of 0.4 wt.-% to 4.5 wt.-%.

Preferably, the cross-linkable comonomer units (B2) are comonomer units with hydrolysable silane-groups.

Hence, preferably, the cross-linkable comonomer units (B2) is represented by formula (I):

$$R^1SiR^2_qY_{3-q} \quad (I)$$

wherein

- $R^1$ is an ethylenically unsaturated hydrocarbyl, hydrocarbyloxy or (meth)acryloxy hydrocarbyl group,
- each $R^2$ is independently an aliphatic saturated hydrocarbyl group,
- Y which may be the same or different, is a hydrolysable organic group and
- q is 0, 1 or 2.

If there is more than one Y group, these do not have to be identical. Specific examples of the cross-linkable comonomer units (B2) are those wherein $R^1$ is vinyl, allyl, isopropenyl, butenyl, cyclohexenyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, or decyl group. A preferred cross-linkable comonomer (B2) is represented by formula (II):

$$CH_2{=}CHSi(OA)_3 \qquad (II)$$

wherein A is a hydrocarbyl group having 1-8 carbon atoms, preferably 1-4 carbon atoms.

Most preferably, the cross-linkable comonomers (B2) comprise vinyl trimethoxysilane (VTMS), vinyl bismethoxyethoxysilane, vinyl triethoxysilane, gamma-(meth) acryloxypropyltrimethoxysilane, gamma (meth)-acryloxypropyltriethoxysilane, vinyl triacetoxysilane and combinations thereof.

Silanol Condensation Catalyst (C)

In a preferred embodiment of the present invention, the cross-linkable polyethylene composition further comprises a silanol condensation catalyst (C).

Preferably, the silanol condensation catalyst (C) comprises, or consists of, a tin based catalyst or a sulphonic acid based catalyst, more preferably comprises, or consist of, a sulphonic acid based catalyst. The tin based catalyst is preferably dibutyl tin dilaureate (DBTL).

The sulphonic acid based catalyst is preferably represented by formula (III):

$$ArSO_3H \qquad (III)$$

or a precursor thereof, Ar being a benzene ring substituted with at least one hydrocarbyl radical such that the total number of carbon atoms of the hydrocarbyl radical(s) is 8-20, or a naphthalene ring substituted with at least one hydrocarbyl radical such that the total number of carbon atoms of the hydrocarbyl radical(s) is 4-18, and the catalyst of formula (III) containing 14-28 carbon atoms in total. This catalyst, as opposed to conventional silanol condensation catalysts, such as e.g. DBTL, allows crosslinking at ambient temperature, such as at room temperature.

Such organic sulphonic acids are described e.g. in EP 736 065, or alternatively, in EP 1 309 631 and EP 1 309 632.

Preferably, the silanol condensation catalyst (C) is present in an amount of 0.00015 to 0.045 wt.-%, or 0.00000044-0.00013 mol-% based on the total polyethylene composition.

If a masterbatch containing the catalyst is used, it is preferably used in an amount of 0.01 to 8 wt.-%, more preferably 0.5 to 7 wt.-%, and most preferably 0.1 to 6 wt.-%, based on the total polyethylene composition.

In addition to the base resin, usual additives for utilization with polyolefins, such as pigments, stabilizers (antioxidant agents), antiacids and/or anti-UVs, antistatic agents and utilization agents (such as processing aid agents) may be present in the polyethylene composition. Preferably, the amount of these additives is 10 wt. % or below, further preferred 8 wt. % or below, still more preferred 5 wt. % or below, and still more preferred 4 wt. % or below of the total composition.

The present invention further provides a cross-linkable polyethylene composition obtainable by a process as described above.

The invention further provides an article suitable for welding comprising, or consisting of, the cross-linkable polyethylene composition, or consisting of, the crosslinkable polyethylene composition according to the invention.

Preferably, the article is a seal or a film, in particular a tarpaulin, a belt, a sunroof, a tent, and/or geotextiles.

Finally, the invention relates to the use of the cross-linkable polyethylene composition according to the invention for high frequency welding.

EXPERIMENTAL PART

Measurement Methods a) Melt Flow Rate

The melt flow rate (MFR) was determined according to ISO 1133 and is indicated in g/10 min. The MFR is an indication of the melt viscosity of the polymer. The MFR is determined at 190° C. for PE and 230° C. for PP. The load under which the melt flow rate is determined is usually indicated as a subscript, for instance $MFR_2$ is measured under 2.16 kg load (condition D).

b) Density

Density of the polymer was measured according to ISO 1183/1872-2B. For the purpose of this invention the density of the blend can be calculated from the densities of the components according to:

$$\rho_b = \sum_i w_i \cdot \rho_i$$

where $\rho_b$ is the density of the blend, $w_i$ is the weight fraction of component 'i' in the blend and $\rho_i$ is the density of the component 'i'.

c) Quantification of Microstructure by NMR Spectroscopy

The content (wt.-% and mol-%) of polar comonomer present in the polymer and the content (wt.-% and mol-%) of silane group(s) containing units (preferably comonomer) present in the polymer composition (preferably in the polymer):

Quantitative nuclear-magnetic resonance (NMR) spectroscopy was used to quantify the comonomer content of the polymer composition or polymer as given above or below in the context.

Quantitative $^1H$ NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-$d_2$ (TCE-$d_2$) using ditertiarybutylhydroxytoluen (BHT) (CAS 128-37-0) as stabiliser. Standard single-pulse excitation was employed utilising a 30 degree pulse, a relaxation delay of 3 s and no sample rotation. A total of 16 transients were acquired per spectra using 2 dummy scans. A total of 32 k data points were collected per FID with a dwell time of 60 μs, which corresponded to a spectral window of approx. 20 ppm. The FID was then zero filled to 64 k data points and an exponential window function applied with 0.3 Hz line-broadening. This setup was chosen primarily for the ability to resolve the quantitative signals resulting from methylacrylate and vinyltrimethylsiloxane copolymerisation when present in the same polymer.

Quantitative $^1H$ NMR spectra were processed, integrated and quantitative properties determined using custom spectral analysis automation programs. All chemical shifts were internally referenced to the residual protonated solvent signal at 5.95 ppm.

When present characteristic signals resulting from the incorporation of vinylacytate (VA), methyl acrylate (MA), butylacrylate (BA) and vinyltrimethylsiloxane (VTMS), in various comonomer sequences, were observed[1]. All comonomer contents calculated with respect to all other monomers present in the polymer.

The vinylacytate (VA) incorporation was quantified using the integral of the signal at 4.84 ppm assigned to the *VA sites, accounting for the number of reporting nuclie per comonomer and correcting for the overlap of the OH protons from BHT when present:

$$VA = (I_{*VA} - (I_{ArBHT})/2)/1$$

The methylacrylate (MA) incorporation was quantified using the integral of the signal at 3.65 ppm assigned to the 1MA sites, accounting for the number of reporting nuclie per comonomer:

$$MA = I_{1MA}/3$$

The butylacrylate (BA) incorporation was quantified using the integral of the signal at 4.08 ppm assigned to the 4BA sites, accounting for the number of reporting nuclie per comonomer:

$$BA = I_{4BA}/2$$

The vinyltrimethylsiloxane incorporation was quantified using the integral of the signal at 3.56 ppm assigned to the 1VTMS sites, accounting for the number of reporting nuclei per comonomer:

$$VTMS = I_{1VTMS}/9$$

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

$$BHT = I_{ArBHT}/2$$

The ethylene comonomer content was quantified using the integral of the bulk aliphatic (bulk) signal between 0.00-3.00 ppm. This integral may include the 1VA (3) and VA (2) sites from isolated vinylacetate incorporation, *MA and MA sites from isolated methylacrylate incorporation, 1BA (3), 2BA (2), 3BA (2), *BA (1) and BA (2) sites from isolated butylacrylate incorporation, the *VTMS and VTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

$$E = (1/4)*[I_{bulk} - 5*VA - 3*MA - 10*BA - 3*VTMS - 21*BHT]$$

It should be noted that half of the signals in the bulk signal represent ethylene and not comonomer and that an insignificant error is introduced due to the inability to compensate for the two saturated chain ends(S) without associated branch sites.

The total mole fractions of a given monomer (M) in the polymer was calculated as:

$$fM = M/(E + VA + MA + BA + VTMS)$$

The total comonomer incorporation of a given monomer (M) in mole percent was calculated from the mole fractions in the standard manner:

$$M[\text{mol}-\%] = 100*fM$$

The total comonomer incorporation of a given monomer (M) in weight percent was calculated from the mole fractions and molecular weight of the monomer (MW) in the standard manner:

$$M[\text{wt.}-\%] = 100*(fM*MW)/((fVA*86.09) + (fMA*86.09) + (fBA*128.17) + (fVTMS*148.23) + ((1 - fVA - fMA - fBA - fVTMS)*28.05))$$

REFERENCES

[1] J. Randall, Macromol. Sci., Rev. Macromol. Chem. Phys. 1989, C29, 201.

If characteristic signals from other specific chemical species are observed the logic of quantification and/or compensation can be extended in a similar manor to that used for the specifically described chemical species. That is, identification of characteristic signals, quantification by integration of a specific signal or signals, scaling for the number of reported nuclei and compensation in the bulk integral and related calculations. Although this process is specific to the specific chemical species in question the approach is based on the basic principles of quantitative NMR spectroscopy of polymers and thus can be implemented by a person skilled in the art as needed.

d) Seal Strength

A TX HF-welding machine of Forsstrom High Frequency AB was used for welding the films. Dimensions of the line were 1200 kW, the sealing bar 1200×25 mm and sealing pressure of 4 bar for polyolefins (2 kg/cm) and 2 bar for PVC (CE1). The base strip of the HF-welding bar was covered by a teflon strip.

Seal Strength Measurement of Ultrasonic Welded Samples:

Analysis was performed on a tensile testing equipment with requirements as described in ISO 527-1. From the samples 25.4 mm wide specimen are cut and mounted with the seal positioned halfway in between the clamps. Following settings are used: gauge length 10 mm, pre-load 0.25 N for 20 s, test speed 100 mm/min, break detection at 75% $F_{max}$.

e) Surface Energy and Dyne Retention

Surface energy is determined via wetting tension according to ASTM D2578-09 µsing test-inks (mixtures of formamide and ethyl cellosolve) with a surface tension in between 34 and 56 dynes/cm, namely "AFS corona treatment tester", supplied by AFS, Augsburg, Germany.

It is important, that the tested surface area is not roughened before wetting but as smooth as possible.

The inks are applied with cotton buds over a surface of 6.5 $cm^2$, starting with a low surface tension-ink until an ink is used, which does not wet the surface anymore The surface tension is then determined visually by estimating how the liquid reacts within the first two seconds following application of the ink onto the surface. The test liquid can shrink and/or form itself into globules (individual droplets) or it can remain unchanged forming an ink-film on the test-film. When a test liquid shrinks or forms into droplets it indicates that the film has a lower surface energy than the liquid applied.

The test should be repeated as many times as necessary with test-inks having surface tension values of +/−2 dynes/cm different from the first measured dyne-value, until the marking remains stable for a period of two seconds or more. Once that has been achieved, the film can be said to have that level or surface energy at least equal to that of the liquid applied.

Further applications should be made until shrinkage or droplets occur within two seconds. This last measurement should be taken as failure, and the surface energy of the liquid used for the previous measurement should be taken to be the surface energy of the film.

The surface tension for the inventive and comparative examples was tested after eight months of aging.

EXAMPLES

Materials

A1 is a very low density copolymer of polyethylene and 1-octene having a density of 883 $kg/m^3$, a $MFR_2$ (2.16 kg, 190° C.) of 1.09 g/10 min, and a peak melt point of 73° C. It is commercially available as Queo 8201 from *Borealis* AG (Austria).

A2 is a very low density copolymer of polyethylene and 1-octene having a density of 883 $kg/m^3$, a $MFR_2$ (2.16 kg, 190° C.) of 1.1 g/10 min, and a peak melt point of 75° C. It is commercially available as Queo 8201LA from *Borealis* AG (Austria).

B1 is a poly(ethylene-co-butylacrylate) with density of 926 $kg/m^3$, $MFR_2$ of 4 g/10 min, an acrylate content of 27 wt.-% and $T_m$ of 90° C., produced in a commercial high pressure tubular reactor.

B2 is a terpolymer of ethylene, methyl acrylate and vinyl trimethoxysilane (VTMS) having 30 wt.-% methyl acrylate and 2.23 wt.-% VTMS, a $MFR_2$ (2.16 kg, 190° C.) of 29 g/10 min, and $MFR_5$ (5 kg, 190° C.) of 99 g/10 min, obtained according to a process as described in WO 2018/171951 A1.

C1 is Ambicat LE4476, which is dodecyl-benzene sulphonic acid (DBSA) used as a silanol condensation catalyst. It is commercially available from *Borealis* AG (Austria)

Compounding

The films comprising the polymer compositions according to the examples were produced by dry-mixing the components using the weight percentages given in Table 2 and immediately extruding them on a Reifenhauser cast film line using the parameters as provided in Table 1.

TABLE 1

| | Ext A [rpm] | Ext B [rpm] | Ext A [bar] | Ext B [bar] | $T_{melt}$ [° C.] | $T_{chill\ roll}$ [° C.] | Speed [m/min] | T-profile [° C.] |
|---|---|---|---|---|---|---|---|---|
| CE2 | 45 | 45 | 250 | 260 | 213/220 | 20 | 3.0 | 210->230 |
| CE3 | 45 | 45 | 168 | 177 | 170/174 | 20 | 3.0 | 150->180 |
| CE4 | 45 | 45 | 87 | 92 | 213/220 | 20 | 3.0 | 210->230 |
| CE5 | 45 | 45 | 168 | 171 | 170/174 | 20 | 3.0 | 150->180 |
| CE6 | 45 | 45 | 194 | 199 | 170/174 | 20 | 3.0 | 150->180 |
| CE7 | 45 | 45 | 200 | 211 | 213/220 | 20 | 3.0 | 210->230 |
| CE8 | 45 | 45 | 111 | 122 | 213/220 | 20 | 3.0 | 210->230 |
| IE1a | 45 | 45 | 186 | 194 | 170/174 | 20 | 3.0 | 150->180 |
| IE1b | 45 | 45 | 198 | 212 | 170/174 | 20 | 3.0 | 150->180 |
| IE1c | 45 | 45 | 172 | 180 | 170/174 | 20 | 3.0 | 150->180 |
| IE2a | 45 | 45 | 179 | 183 | 170/174 | 20 | 3.0 | 150->180 |
| IE2b | 45 | 45 | 184 | 193 | 170/174 | 20 | 3.0 | 150->180 |
| IE2c | 45 | 45 | 187 | 193 | 170/174 | 20 | 3.0 | 150->180 |

To the sealed films, a PET tape was applied to measure more correctly the seal strength of the films in order to avoid elongation. The films of the present examples are very elastic and to avoid too much elongation, the PET adhesive tape was applied at the outer side of the HF-sealed film before testing the seal strength.

TABLE 2

| | | (A) | | (B) | | (C) | Seal | Seal | Dyne | | |
|---|---|---|---|---|---|---|---|---|---|---|---|
| | PVC wt-% | A1 wt-% | A2 wt-% | B1 wt-% | B2 wt-% | C1 wt-% | strength N/mm | time+ s | Ret. d | Thickness mm | Power % |
| CE1 | 100 | — | — | — | — | — | 2.7 | 1.8 | 36 | 0.3 | 45 |
| CE2 | — | 100 | — | — | — | — | 3.3 | 7 | <34 | 0.27 | 50 |
| CE3 | — | — | 100 | — | — | — | 4.4 | 7 | <34 | 0.285 | 50 |
| CE4 | — | | — | 100 | — | — | 3.4 | 5 | <34 | 0.235 | 45 |
| CE5 | — | — | — | — | 100 | — | 4.6 | 5 | <34 | 0.240 | 45 |

TABLE 2-continued

| | PVC wt-% | (A) A1 wt-% | A2 wt-% | (B) B1 wt-% | B2 wt-% | (C) C1 wt-% | Seal strength N/mm | Seal time+ s | Dyne Ret. d | Thickness mm | Power % |
|---|---|---|---|---|---|---|---|---|---|---|---|
| CE6 | — | — | — | — | 95 | 5 | —* | 7 | 36 | 0.25 | 50 |
| CE7 | — | 75 | — | 25 | — | — | 3.6 | 5 | <34 | 0.28 | 45 |
| CE8 | — | 25 | — | 75 | — | — | 3.5 | 5 | <34 | 0.257 | 45 |
| IE1a | — | — | 75 | — | 25 | — | 4.6 | 5 | <34 | 0.28 | 45 |
| IE1b | — | — | 50 | — | 50 | — | 4.9 | 5 | 36 | 0.28 | 45 |
| IE1c | — | — | 25 | — | 75 | — | 4.7 | 5 | <34 | 0.3 | 45 |
| IE2a | — | — | 72.5 | — | 22.5 | 5 | 5.1 | 5 | <34 | 0.273 | 45 |
| IE2b | — | — | 47.5 | — | 47.5 | 5 | 4.7 | 5 | <34 | 0.3 | 45 |
| IE2c | — | — | 22.5 | — | 72.5 | 5 | 1.5 | 6 | <34 | 0.292 | 50 |

*No sealing achieved

+Measured after eight months of aging. Between extrusion and HF-welding: six months; between HF-welding and testing: two months Comparative example CE1 uses the commonly used PVC resulting in fast sealing times, but not very good sealing strengths.

Comparative examples CE4-6 prove the good sealability of acrylate containing polyethylenes, but still have low dyne retention values. CE6 shows that compositions using only terpolymer have the problem of instant cross-linking in combination with silanol condensation catalysts. Nevertheless, CE6 still shows good dyne retention.

It can be further seen that samples having pure A1 or A2 require higher power of the sealing equipment and sealing time was longer.

The use of cross-linkable terpolymers blended with ethylene plastomers gives the advantage of sealabilty on a high frequency welding machine and no instant crosslinking, (i.e the samples need more than eight months for crosslinking by moisture). Furthermore, dyne retention is improved. Hence, the present invention provides a weldable polyethylene composition having good caulkability, good HF weldability, good seal strength, and good printability.

The invention claimed is:

1. A cross-linkable polyethylene composition for high frequency welding comprising a copolymer (A) of ethylene and an α-olefin comonomer (A1) with 3 to 12 carbon atoms having a density of from 850 to 970 kg/m$^3$, and a terpolymer (B) of ethylene, a polar comonomer (B1) and a cross-linkable comonomer (B2)

wherein the weight ratio of the copolymer (A) to the terpolymer (B) is 55:45 to 75:25, based on the combined weight of (A) and (B).

2. The cross-linkable polyethylene composition according to claim 1, wherein the α-olefin comonomer (A1) of the ethylene copolymer (A) has 4 to 10 carbon atoms.

3. The cross-linkable polyethylene composition according to any of the preceding claims, wherein the ethylene copolymer (A) has a density in the range from 860 to 930 kg/m$^3$, measured according to ISO 1183-1:2004.

4. The cross-linkable polyethylene composition according to claim 1, wherein the ethylene copolymer (A) has a $MFR_2$ (2.16 kg/190° C.) measured according to ISO 1133 in the range of from 0.5 to 25 g/10 min.

5. The cross-linkable polyethylene composition according to claim 1, wherein the ethylene terpolymer (B) has a $MFR_2$ (2.16 kg/190° C.) measured according to ISO 1133 in the range of from 0.1 to 50 g/10 min.

6. The cross-linkable polyethylene composition according to claim 1, wherein the polar comonomer (B1) is present in the ethylene terpolymer (B) in an amount in the range of 10 to 35 wt-% with respect to the total weight of the ethylene terpolymer (B).

7. The process according to claim 1, wherein the polar monomer (B1) of the ethylene terpolymer (B) is methyl acrylate.

8. The cross-linkable polyethylene composition according to claim 1, wherein the cross-linkable comonomer (B2) is present in the ethylene terpolymer (B) in an amount in the range of 0.1 to 6 wt-%, with respect to the total weight of the ethylene terpolymer (B).

9. The cross-linkable polyethylene composition according to claim 1, wherein the cross-linkable comonomer (B2) of the ethylene terpolymer (B) comprises at least one hydrolysable silane-group.

10. The cross-linkable polyethylene composition according to claim 9, wherein the at least one hydrolysable silane-group of the cross-linkable comonomer (B2) is represented by formula (I):

$$R^1SiR^2_qY_{3-q} \quad \text{(I)}$$

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y, which may be the same or different, is a hydrolysable organic group, and q is 0, 1 or 2.

11. The cross-linkable polyethylene composition according to claim 1, wherein the cross-linkable polyethylene composition further comprises a silanol condensation catalyst (C).

12. The cross-linkable polyethylene composition according to claim 1, wherein the sealing time is lower than 7 s.

13. The cross-linkable polyethylene composition according to claim 1, wherein the seal strength of the cross-linkable polyethylene composition is at least 1.0 N/mm$^2$, measured according to ISO 527-1.

14. Article suitable for high frequency welding comprising the cross-linkable polyethylene composition according to claim 13, wherein the article is a film or a seal.

15. A method, comprising high frequency welding an article formed from the cross-linkable polyethylene composition according to claim 1.

16. The cross-linkable polyethylene composition according to claim 2, wherein the α-olefin comonomer (A1) of the ethylene copolymer (A) is 1-octene.

* * * * *